US012696989B2

(12) United States Patent
Townsend

(10) Patent No.: US 12,696,989 B2
(45) Date of Patent: Aug. 4, 2026

(54) DEVICE FOR STORING ELONGATED UTENSILS

(71) Applicant: Alastair James Townsend, Seattle, WA (US)

(72) Inventor: Alastair James Townsend, Seattle, WA (US)

(*) Notice: Subject to any disclaimer, the term of this patent is extended or adjusted under 35 U.S.C. 154(b) by 0 days.

(21) Appl. No.: 19/032,226

(22) Filed: Jan. 20, 2025

(65) Prior Publication Data

US 2026/0206989 A1 Jul. 23, 2026

(51) Int. Cl.

| | |
|---|---|
| ***A47G 21/14*** | (2006.01) |
| ***A47F 5/00*** | (2006.01) |
| ***A47F 5/10*** | (2006.01) |
| ***A47G 21/06*** | (2006.01) |
| *A47B 46/00* | (2006.01) |
| *A47B 81/04* | (2006.01) |
| *A47F 7/00* | (2006.01) |
| *B25H 3/04* | (2006.01) |

(52) U.S. Cl.

CPC ............ *A47G 21/14* (2013.01); *A47F 5/0081* (2013.01); *A47F 5/10* (2013.01); *A47G 21/103* (2013.01); *A47B 46/005* (2013.01); *A47B 81/04* (2013.01); *A47F 7/0021* (2013.01); *B25H 3/04* (2013.01)

(58) Field of Classification Search

CPC .... A47G 21/14; A47G 21/103; A47G 21/145; A47F 5/0025; A47F 5/005; A47F 3/14; A47F 3/145; A47F 7/00; A47F 7/0028; A47F 5/0062; A47F 7/0021; A47F 2001/103; A47F 5/0081; A47F 5/10; A47F 7/0064; A47B 81/00; A47B 46/00; A47B 46/005; A47B 81/04; B25H 3/04; B25H 3/025; B25H 3/06; A47J 47/16; B65D 85/28

See application file for complete search history.

(56) References Cited

U.S. PATENT DOCUMENTS

| | | | | | |
|---|---|---|---|---|---|
| 490,156 | A * | 1/1893 | Miller | B65D 5/5266 | 206/742 |
| 2,775,342 | A * | 12/1956 | Smith | B25H 3/003 | 206/755 |
| 3,018,876 | A * | 1/1962 | Huot | B65D 85/24 | 206/379 |
| 3,074,539 | A * | 1/1963 | Rogovin | B25H 3/003 | 206/379 |

(Continued)

*Primary Examiner* — Devin K Barnett

(57) ABSTRACT

A storage device for elongated utensils comprises a case with an open top containing a pivotally mounted utensil holder with tiered compartments. The compartments limit utensil insertion depth, keeping ends visible and accessible. The holder rotates upward from a horizontal stored position to an angled access position via an integrated handle. A retention system secures the holder in the raised position for two-handed access to utensils. Multiple embodiments of the retention system are disclosed, including magnetic pairs, a flexible strip mechanism, and a spring-loaded latch. The holder returns to horizontal position by disengaging the retention system. The device functions in drawers, on flat surfaces, or wall-mounted. This space-efficient design particularly benefits storing paired utensils such as chopsticks, preventing damage while maintaining visibility and easy access.

7 Claims, 13 Drawing Sheets

(56) References Cited

U.S. PATENT DOCUMENTS

| | | | | | |
|---|---|---|---|---|---|
| 3,086,645 | A * | 4/1963 | Yount | G09F 5/02 | 206/751 |
| 4,006,821 | A * | 2/1977 | Sautter | B25H 3/003 | 312/902 |
| 4,660,719 | A * | 4/1987 | Peterson | B25H 3/003 | 206/754 |
| 5,641,170 | A * | 6/1997 | Helm | B25H 3/027 | 280/30 |
| 5,746,316 | A * | 5/1998 | La Barre | B25H 3/003 | 206/443 |
| 5,813,533 | A * | 9/1998 | Knoblauch | B25H 3/003 | 206/748 |
| 6,024,218 | A * | 2/2000 | Knoblauch | B25H 3/003 | 206/372 |
| D444,299 | S * | 7/2001 | Budert | D3/905 | |
| 6,283,291 | B1 * | 9/2001 | Vasudeva | B25H 3/003 | 206/747 |
| 6,382,421 | B1 * | 5/2002 | Dao | B44D 3/04 | 206/371 |
| RE38,905 | E * | 12/2005 | Wei | B25H 3/003 | 312/902 |
| 6,988,616 | B2 * | 1/2006 | Chen | B25H 3/003 | 206/759 |
| D516,315 | S * | 3/2006 | Pangerc | D3/319 | |
| 7,021,464 | B2 * | 4/2006 | Chen | B25H 3/003 | 206/743 |
| 7,165,674 | B2 * | 1/2007 | Pangerc | B25H 3/003 | 206/443 |
| 7,255,229 | B2 * | 8/2007 | Roesler | B25H 3/003 | 206/443 |
| 7,264,118 | B2 * | 9/2007 | Chen | B25H 3/00 | 206/372 |
| 7,325,682 | B2 * | 2/2008 | Seymour | B25H 3/003 | 206/754 |
| 7,328,797 | B2 * | 2/2008 | Lin | B25H 3/003 | 206/372 |
| 7,357,250 | B2 * | 4/2008 | Hagemann | A01K 97/06 | 206/315.11 |
| 7,364,041 | B2 * | 4/2008 | Roesler | B25H 3/003 | 206/379 |
| 10,710,235 | B1 * | 7/2020 | Cantlon | B25H 3/025 | |
| D932,847 | S * | 10/2021 | Joseph | D7/637 | |
| D972,893 | S * | 12/2022 | Worden, IV | D7/600.1 | |

* cited by examiner

DEVICE FOR STORING ELONGATED UTENSILS

This application claims the benefit of U.S. Provisional Application No. 63/623,899, filed Jan. 23, 2024 12:15:38 PM ET.

FIELD OF THE INVENTION

This invention relates generally to storage containers for elongated objects, and more specifically, to a storage device for organizing, protecting, and providing easy access to elongated utensils, such as pairs of chopsticks.

BACKGROUND OF THE INVENTION

Elongated objects, particularly utensils like chopsticks, present unique storage challenges. Chopsticks, which typically come in pairs, vary significantly in size, shape, material, color, and design, and are often chosen to match an individual's hand size and personal aesthetic preferences. In many households, each family member may possess multiple distinct pairs of chopsticks, necessitating an organized storage solution that allows for easy identification and selection of a specific pair.

Existing containers for storing elongated objects include rectangular boxes, which are suboptimal as they often result in chopsticks being piled haphazardly, making it difficult to find matching pairs efficiently. Organizing trays with multiple partitions are commonly used within kitchen drawers to segregate utensils, but present the same difficulty. A variation on these trays integrates angled shelves designed to save space by layering the inserted utensils, but these are not conducive to accommodating longer utensils like chopsticks, which tend to protrude above the height limitations of standard drawers, thereby impeding their closure. (See U.S. Pat. Nos. D972893S and D932847S.)

Vertical storage solutions like cups can facilitate the identification of individual chopsticks and can also be divided with internal partitions, but are incompatible with the vertical space constraints of typical kitchen drawers. Additionally, the storage of chopsticks in a loose manner can lead to damage, especially for those that are ornately decorated or possess significant monetary or sentimental value, as repeated contact with other utensils can mar their finish and reduce their longevity.

The prior art includes containers designed for elongated objects, such as drill bits, which feature lids that connect to a tray or holder, lifting the holder as the lid pivots open. (See U.S. Pat. Nos. 2,775,342, 3,074,539, 3,086,645, and 4,006,821.) However, these solutions are not tailored to the unique dimensions and storage needs of chopsticks. Moreover, lids within drawers are impractical as they can obstruct access and are cumbersome to maneuver, particularly for lengthy objects.

SUMMARY OF THE INVENTION

This invention presents a novel device and method for storing elongated utensils, such as chopsticks, that improves the utensils' visibility, protection and accessibility, particularly when stored in confined spaces, such as a kitchen drawer. It is a dual-component system consisting of a operable utensil holder with an integrated handle, pivotally connected to a stationary case.

In the primary embodiment, the outer case is a five-walled enclosure with two longer sides, two shorter ends, and a flat base, forming a protective exterior. Within this case resides the utensil holder, featuring an open-ended grid of compartments arranged in tiered rows. One end of each utensil, or set of utensils, is contained and supported by partially inserting them into one of the compartments, leaving the unsupported ends exposed. This tiered design ensures each utensil is offset from the one above, facilitating effortless identification in both the holder's open and closed positions while also aiding extraction.

Operation is intuitive: the user lifts the handle, pivoting the holder to an open raised position wherein the exposed ends of the utensils protrude above the case, making them accessible. The holder is temporarily secured at a certain raised angle, freeing both hands for inserting or extracting the utensils. The primary embodiment employs a magnetic retention system involving pairs of aligned magnets embedded within the interior walls of the case and the corresponding sides of the holder. To close, a simple push on the handle counteracts the magnetic attraction, enabling the holder to pivot back to the closed horizontal state within the case.

The design is versatile, functioning horizontally inside drawers or resting upon flat surfaces, such as a countertop. It can also be operated vertically and can be mounted onto a wall.

In a second embodiment, a continuous hinge marries the end walls of the case and the holder. The hinge allows the holder to rotate in relation to the case, functioning in a manner akin to the primary embodiment.

In a third embodiment, the case is streamlined, consisting of only two longitudinal side walls and a flat base. Two sets of binding screws marry the case and the holder by penetrating holes in both components. The binding screws allow the holder to rotate in relation to the case, functioning in a manner akin to the primary embodiment. This embodiment employs a unique retention system comprising a vertical rubber strip position beneath the holder. The strip supports a transversal rod in the bottom of the holder, holding it secure in the open position.

A fourth embodiment incorporates a spring-loaded latch mechanism in the holder. When the user exerts downward force to the holder it disengages the latch and the holder rotates upward into the open position, where it will remain stationary under the spring's tension. To close, another downward push of the holder's top causes the holder to pivot back into the original closed position and latch in place.

DESCRIPTION OF THE DRAWINGS

The present invention may be better understood, and its numerous features and advantages made apparent to those skilled in the art by referencing the accompanying drawings. Common numbering is employed where an element is depicted in multiple drawings.

DETAILED DESCRIPTION OF THE INVENTION

Figure 1:
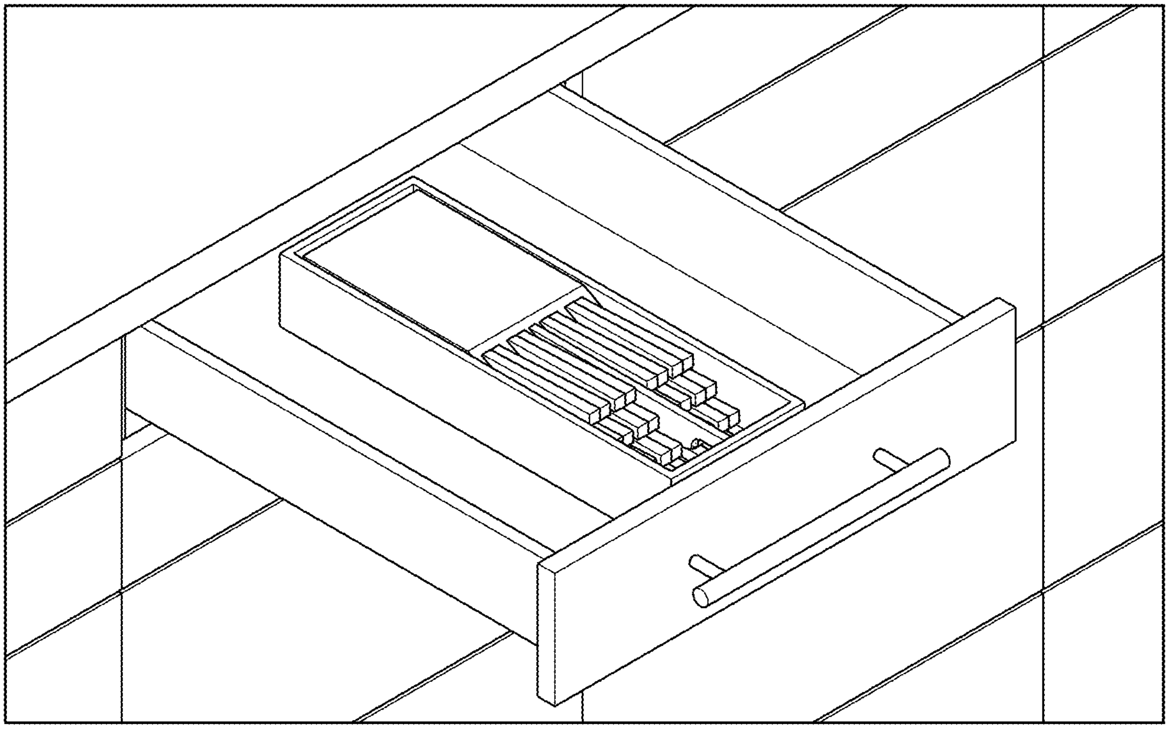
FIG. 1 is an isometric view of the primary embodiment of the invention in the closed state within an open kitchen drawer.
Figure 2:
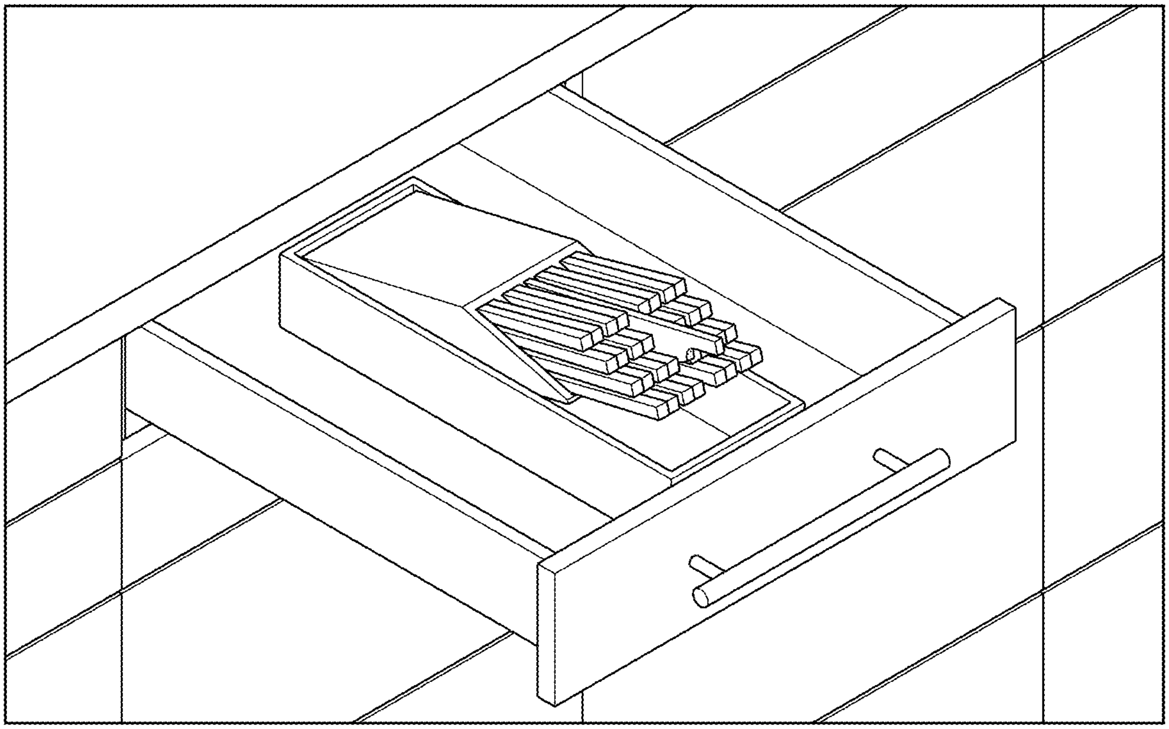
FIG. 2 is an isometric view of the primary embodiment of the invention in the open state within an open kitchen drawer.
Figure 3:
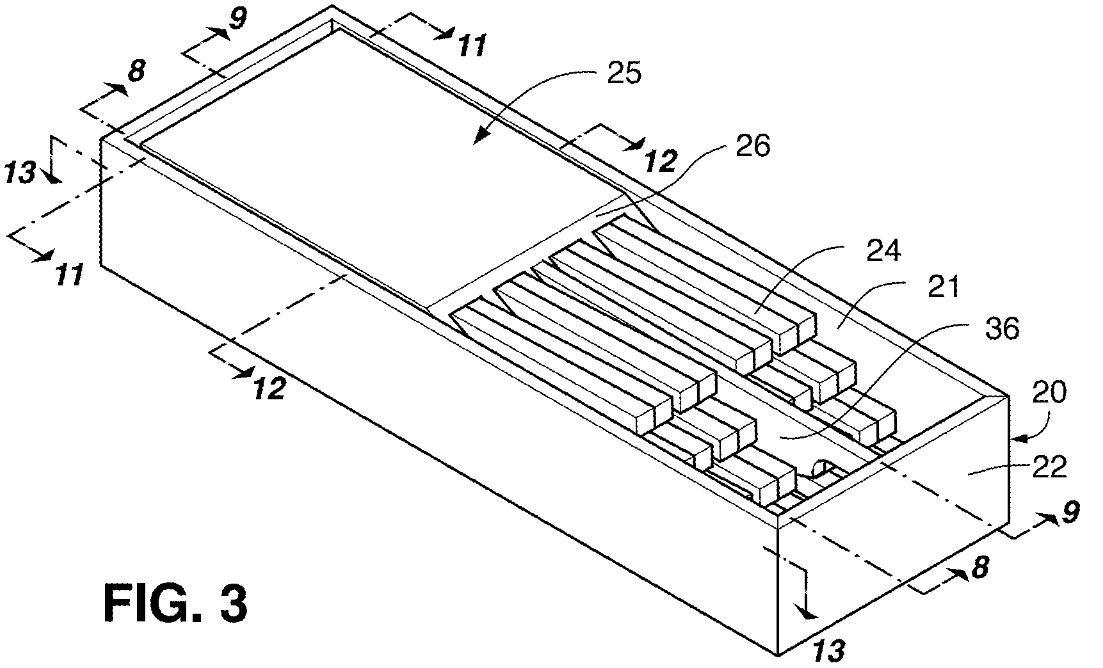
FIG. 3 is an isometric view of the primary embodiment of the invention shown containing chopsticks in the closed state.
Figure 4:
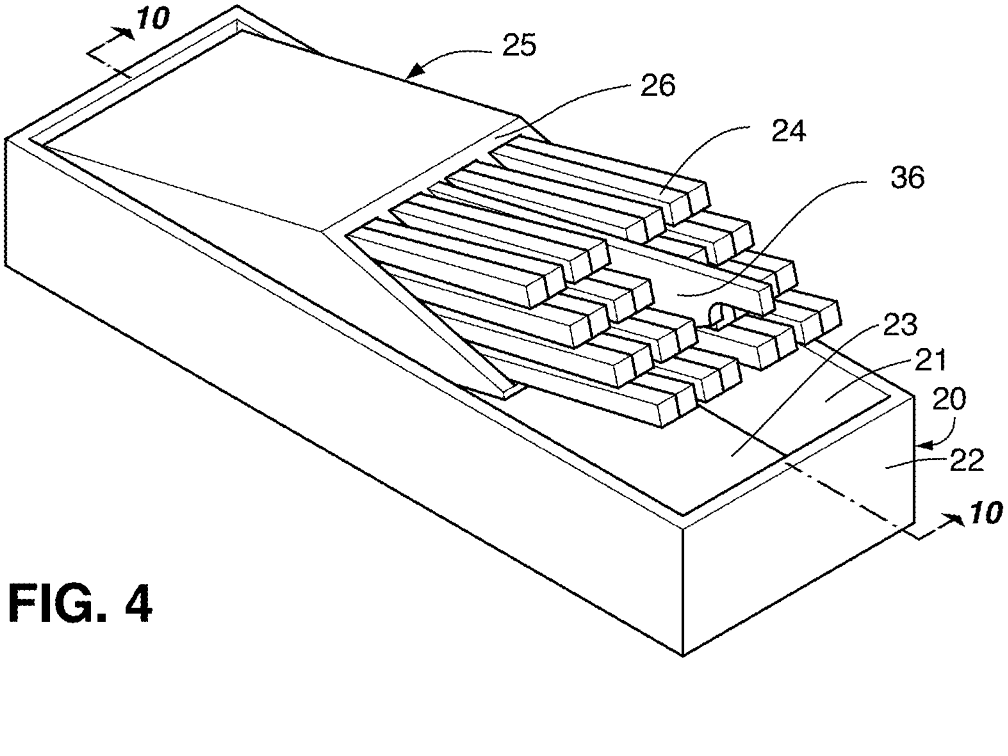
FIG. 4 is an isometric view of the primary embodiment of the invention shown containing chopsticks in the open state.
Figure 5:
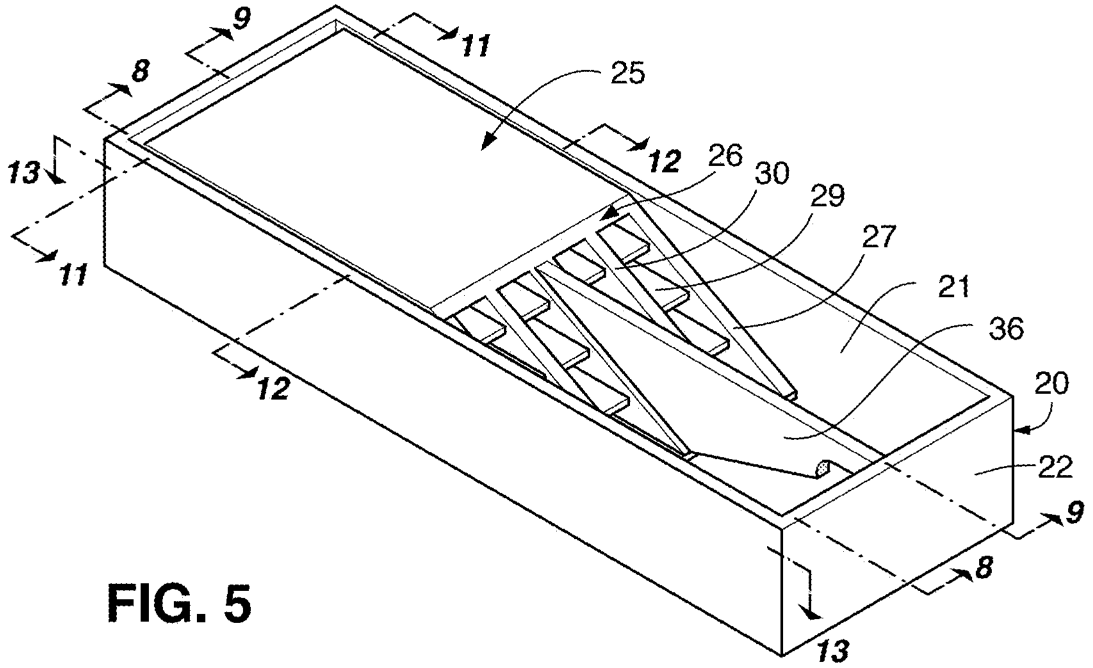
FIG. 5 is an isometric view of the primary embodiment of the invention shown empty in the closed state.
Figure 6:
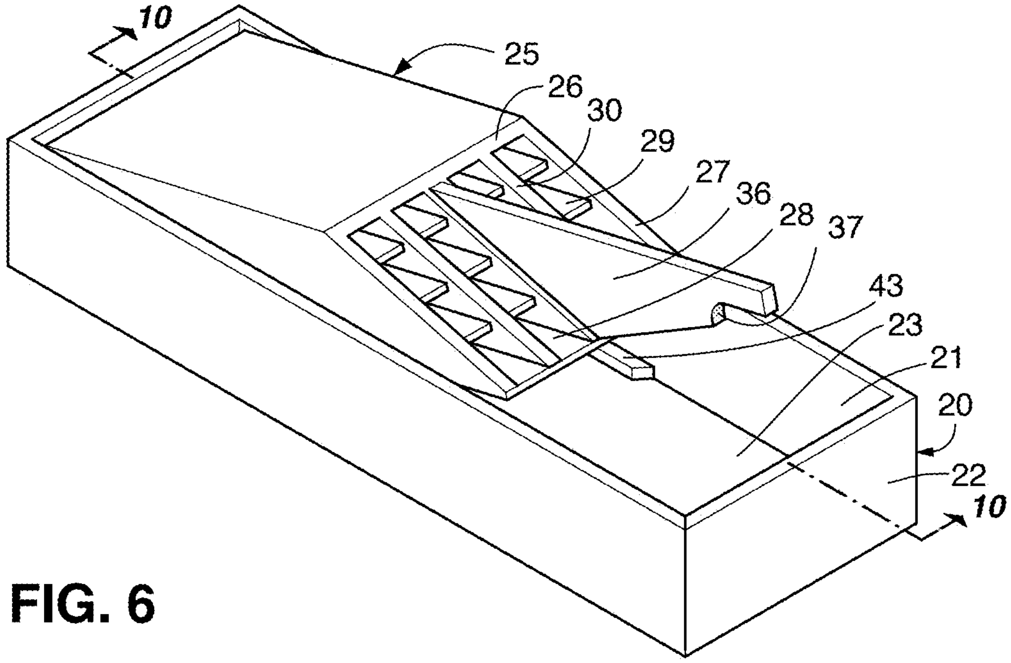
FIG. 6 is an isometric view of the primary embodiment of the invention shown empty in the open state.
Figure 7:
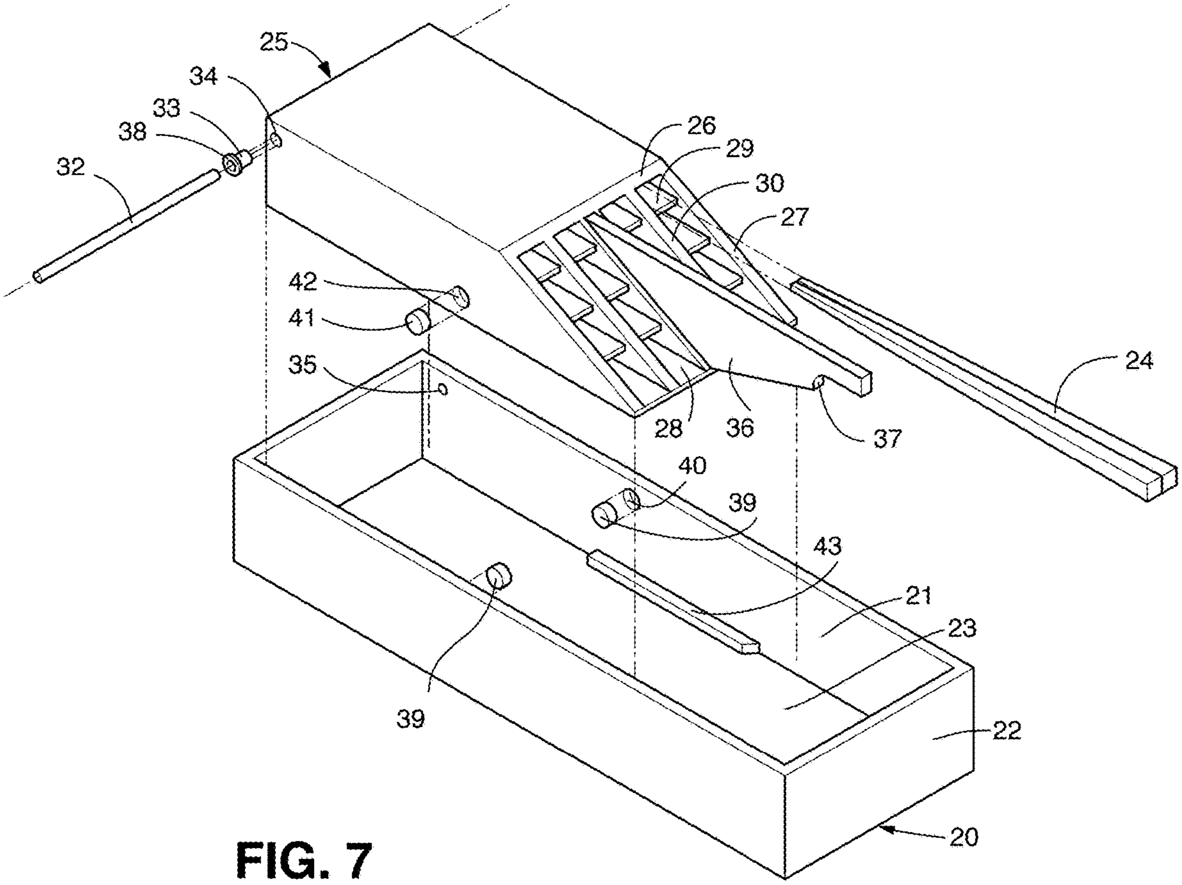
FIG. 7 is an isometric view of the primary embodiment of the invention, separated into its major components.
Figure 8:
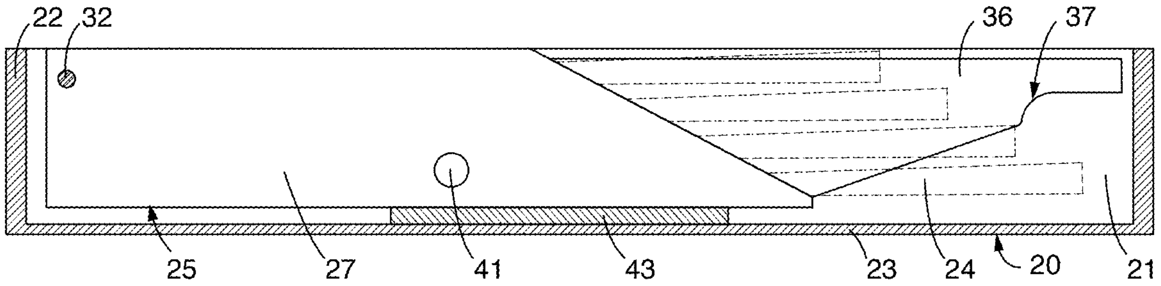
FIG. 8 is a longitudinal cross sectional view of the primary embodiment of the invention taken along lines 8-8 in FIGS. 3 and 5.

Referring to the drawings FIGS. 1 through 16, the preferred embodiment features a case 20 with parallel vertical side walls running longitudinally 21, parallel vertical end walls 22 running transversally, and a flat horizontal base 23 forming the floor. The case 20 is designed without a top cover or lid, ensuring clear visibility and easy access to the utensils 24 within the utensil holder 25.

Figure 9:
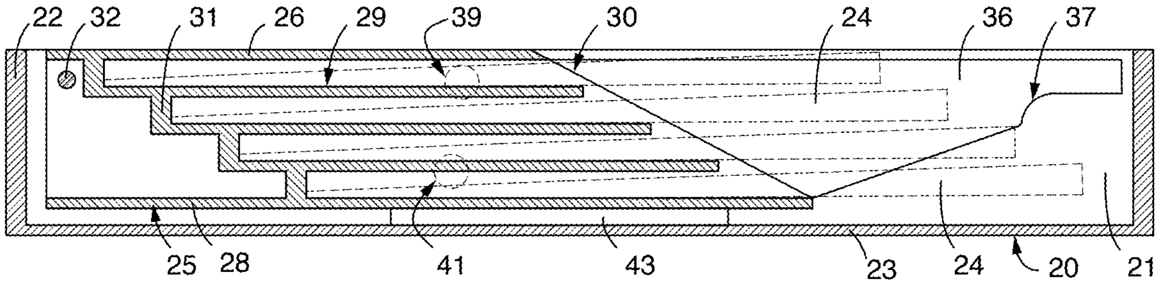
FIG. 9 is a longitudinal cross sectional view of the primary embodiment of the invention taken along lines 9-9 in FIGS. 3 and 5.

The exterior of the utensil holder features a flat horizontal top 26, two straight vertical side walls 27, and a flat horizontal base 28. Internally, the holder is organized into individual compartments by a series of equally spaced, flat horizontal trays 29, straight vertical partitions that run longitudinally 30, and straight vertical end walls that run transversally 31. Notably, as illustrated in FIG. 9, these end walls 31 are designed to restrict the insertion depth of each utensil in its compartment, allowing the remaining portion to extend freely, thereby enabling easy grasping by the user. Additionally, transversal open edges of the utensil holder's base 28, trays 29, and top 26 each retreat incrementally in a step-like fashion from the layer beneath. The vertical side walls 27 and the vertical partitions 30 are angled to mirror the ascending rise and run of the trays. This arrangement ensures that each layer of stored utensils is both offset and visible when viewed from above, facilitating quick identification and retrieval of the utensils.

A cylindrical rod 32, functioning as a pivot, is aligned along a transverse axis and passes through bushings 33, which in turn are fitted into aligned holes 34 in the utensil holder's vertical side walls 27. Each end of the rod 32 is seated within stopped holes 35 located in the corresponding interior side walls 21 of the case 20. A lever arm 36 integrated with the utensil holder extends to the opposite end wall of the case, leaving enough clearance to permit it to rotate unobstructed. The user can easily lift the holder with a single finger hooked under a curved cutout 37 at the end of the lever arm 36. The flanges 38 of the bushings 33 are sized to create a small gap between the case's interior side walls 21 and the utensil holder's exterior side walls 27, ensuring smooth and unobstructed pivoting action of the holder.

Figure 10:
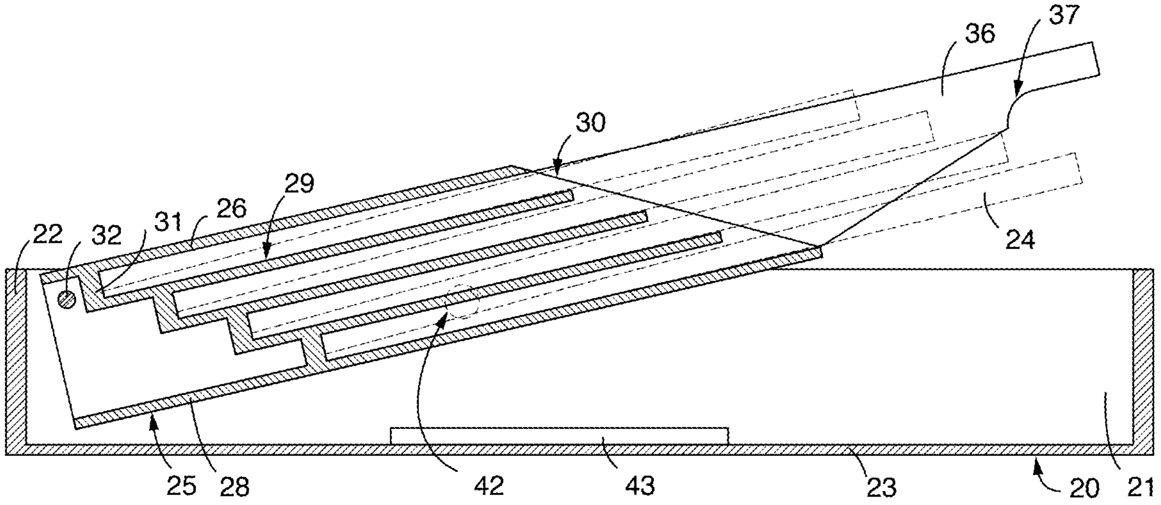
FIG. 10 is a longitudinal cross sectional view of the primary embodiment of the invention taken along lines 10-10 in FIGS. 2 and 4.
Figure 11:
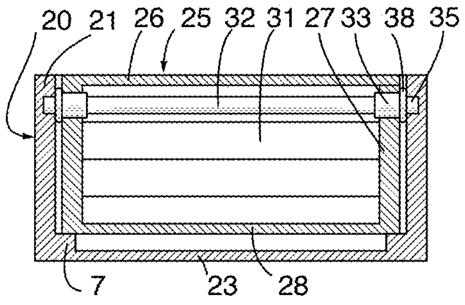
FIG. 11 is a transverse cross sectional view of the primary embodiment of the invention taken along lines 11-11 in FIGS. 3 and 5.
Figure 12:
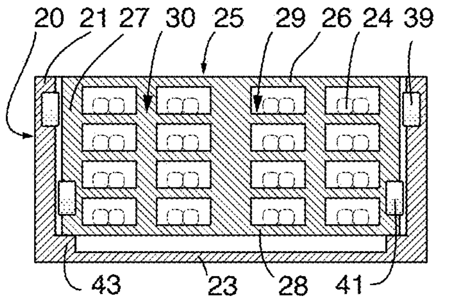
FIG. 12 is a transverse cross sectional view of the primary embodiment of the invention taken along lines 12-12 in FIGS. 3 and 5.
Figure 13:
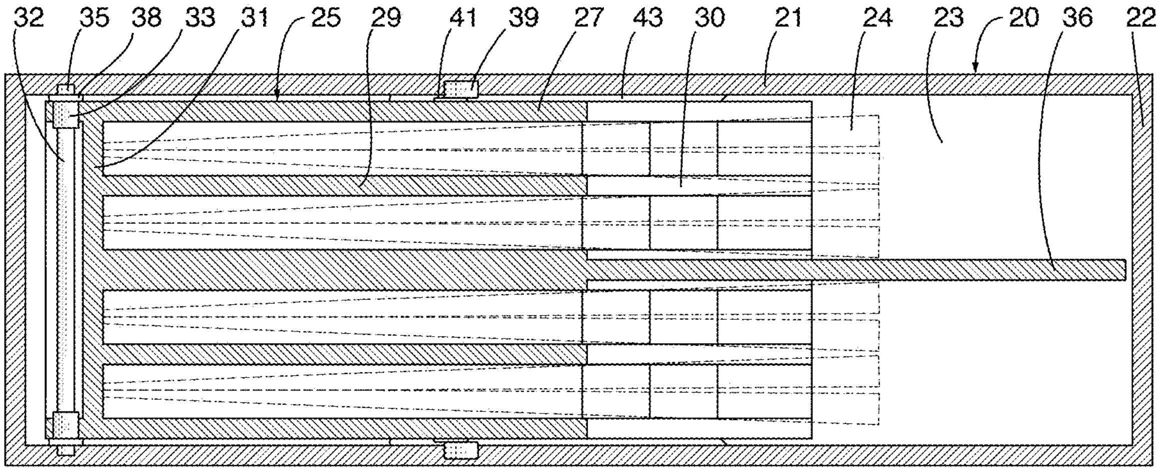
FIG. 13 is a plan sectional view of the primary embodiment of the invention taken along lines 13-13 in FIGS. 3 and 5.

Two identical magnets 39 are partially embedded into corresponding stopped holes 40 in the two longitudinal interior walls of the case. They are positioned at such a depth that their top surfaces protrude slightly from the walls. This protrusion is half the gap between the interior walls of the case and the exterior walls of the utensil holder. Similarly, two other identical magnets 41 are embedded into stopped holes 42 on the utensil holder's exterior longitudinal walls. These magnets are oriented in reverse polarity with the first set and are also set to protrude by the same distance. This design ensures that when the utensil holder is lifted and pivoted towards the open state, as depicted in FIG. 10, the magnets on the holder come into direct contact with the corresponding magnets on the case 42. The magnetic force securely holds the utensil holder in the open position, allowing the user to freely use both hands for inserting or removing utensils without the need to support the holder.

After a user has placed or retrieved utensils, they can then press down on the handle 36, which causes the utensil holder to pivot downward. This action separates the magnets 39, 41, allowing the holder to return to its closed position within the case 20. Stoppers 43, attached to the interior base of the case, halt the holder's descent, supporting it in a horizontal position at rest and maintaining a gap between the utensil holder and the case's floor to facilitate unobstructed pivoting.

Figure 14:
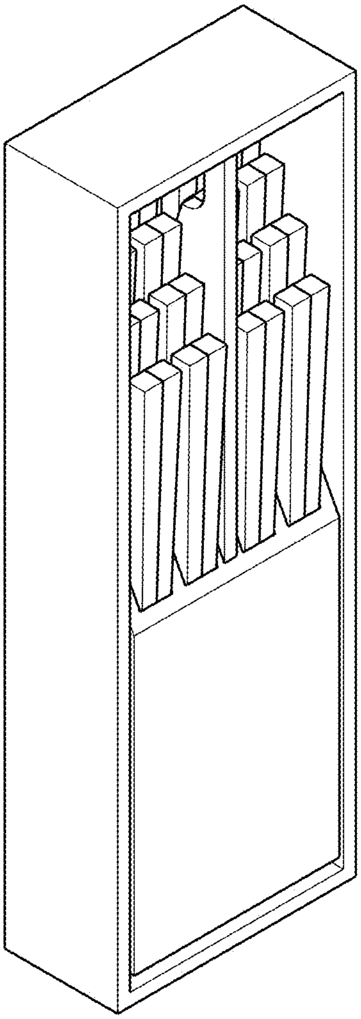
FIG. 14 is an isometric view of the primary embodiment of the invention, shown in an alternate vertical orientation, containing chopsticks in the closed state.
Figure 15:
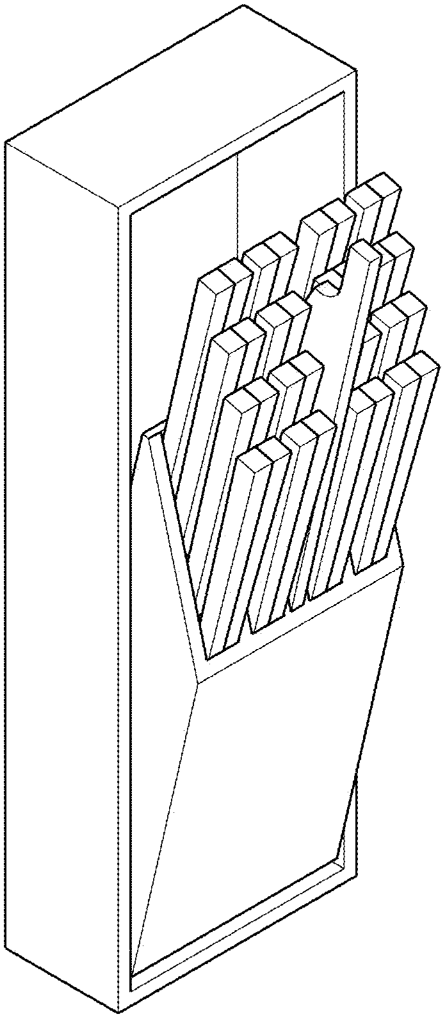
FIG. 15 is an isometric view of the primary embodiment of the invention, shown in an alternate vertical orientation, containing chopsticks in the open state.
Figure 16:
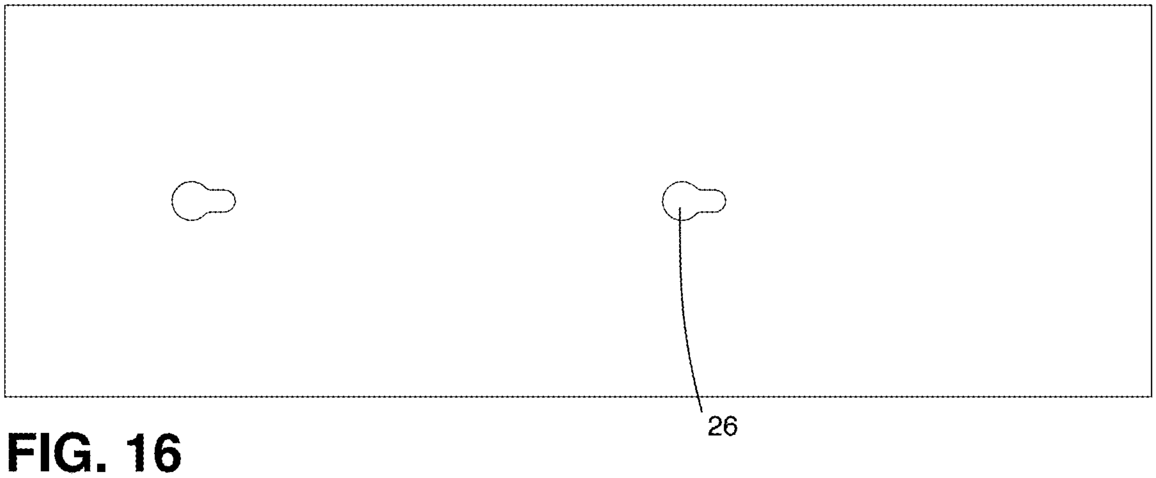
FIG. 16 is a plan view of the bottom of the primary embodiment of the invention.

The invention may incorporate two holes 26 on the bottom of the case 20, aligned beneath the utensil holder's base 28 when it is in the closed position. These holes are intended to accommodate the heads of screws, which are horizontally mounted into a vertical surface. This arrangement enables the case to be secured against the vertical surface, such as a wall, in an upright orientation, as shown in FIG. 14 and FIG. 15, positioning the handle 36 at the top and the utensil holder 25 at the bottom, thereby optimizing space and access.

Figure 17:
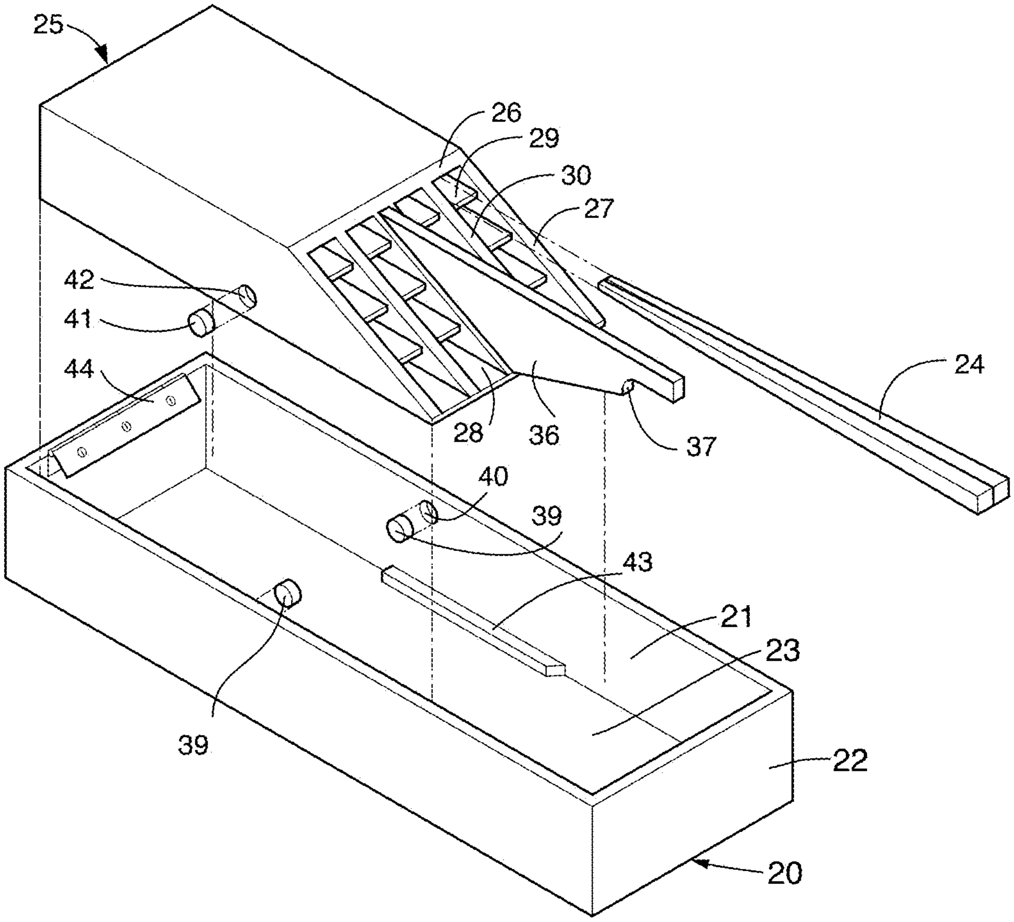
FIG. 17 is an isometric view of the second embodiment of the invention, separated into its major components.
Figure 18:
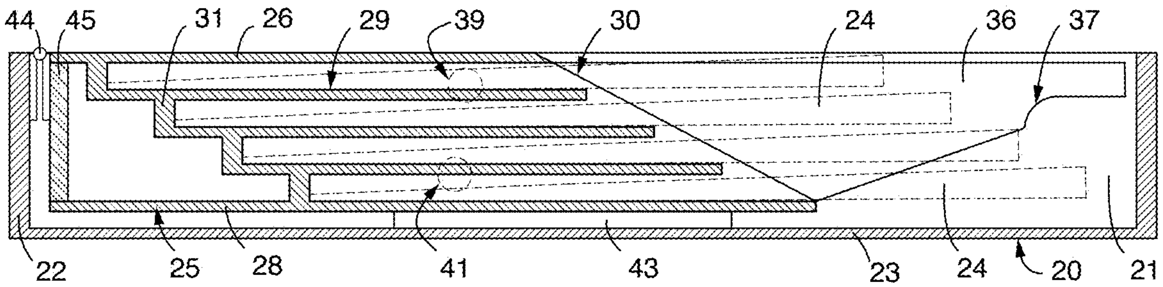
FIG. 18 is a longitudinal cross sectional view of the second embodiment of the invention taken along lines 10-10.
Figure 19:
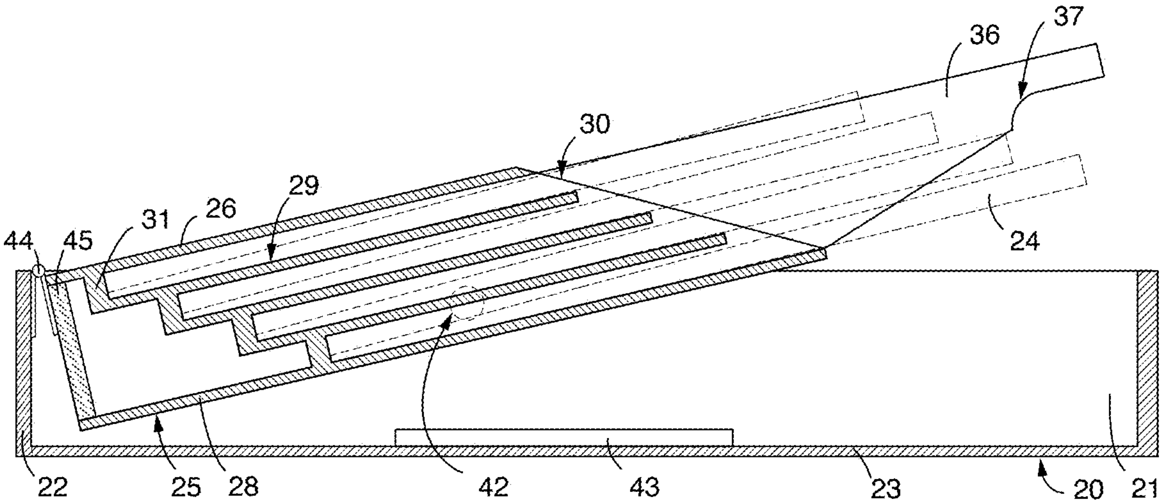
FIG. 19 is a transverse cross sectional view of the primary embodiment of the invention taken along lines 11-11.

A second embodiment shown in FIGS. 17 through 19 incorporates a continuous hinge 44 affixed to the interior of one of the end walls of the case and an end wall in the rear of the holder 45. The hinge 44 allows the holder to rotate in relation to the case, functioning in a manner akin to the primary embodiment.

Figure 20:
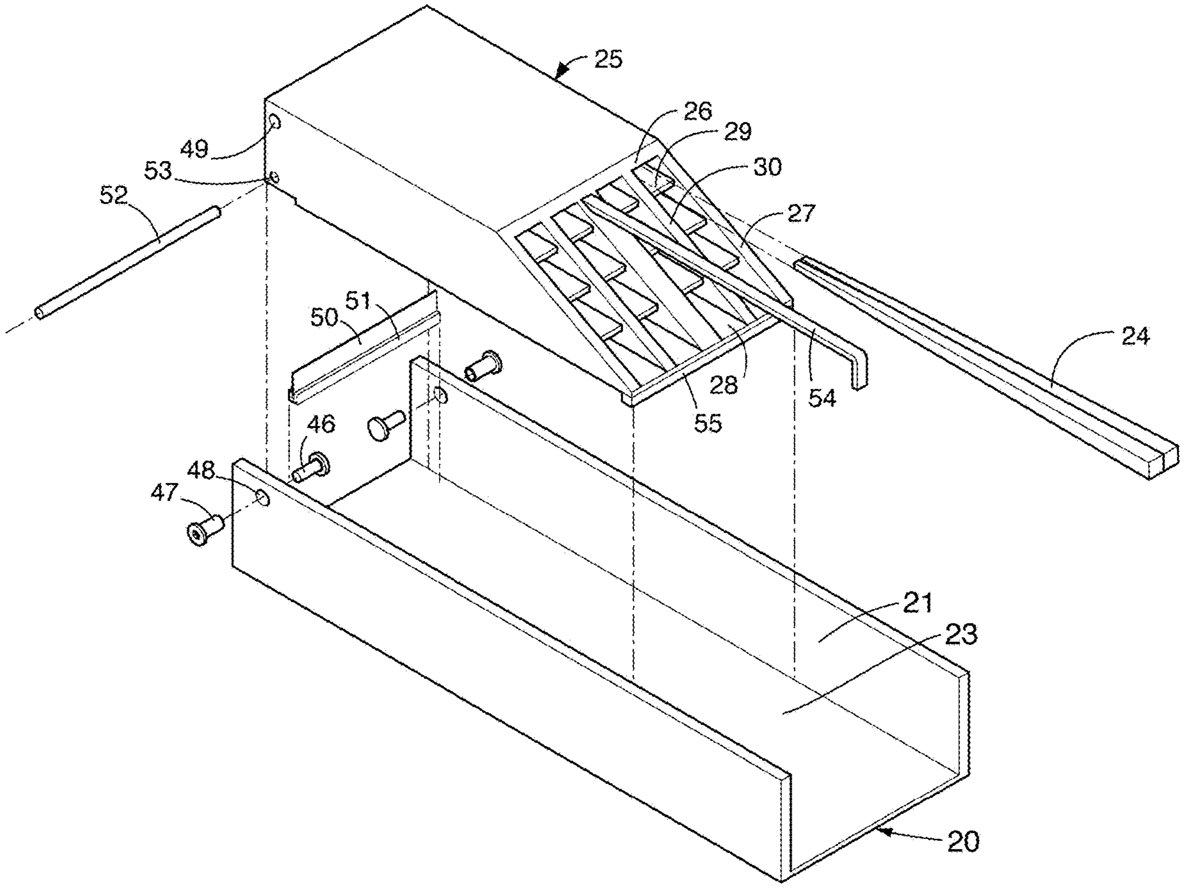
FIG. 20 is an isometric view of the third embodiment of the invention, separated into its major components.
Figure 21:
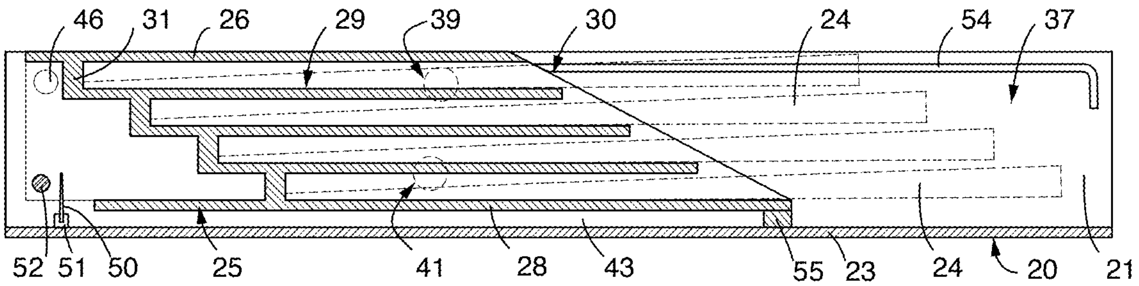
FIG. 21 is a longitudinal cross sectional view of the third embodiment of the invention taken along lines 10-10.
Figure 22:
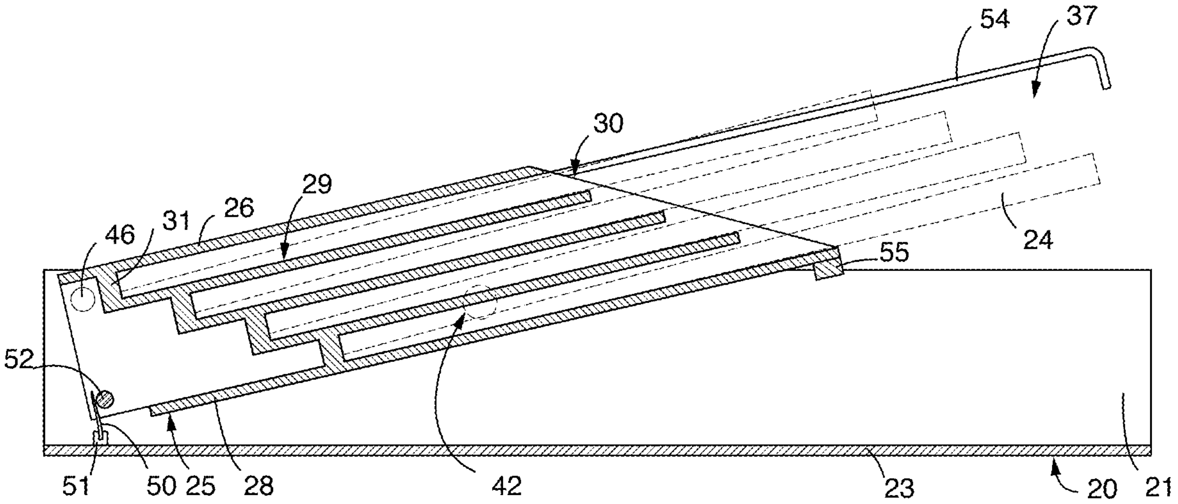
FIG. 22 is a transverse cross sectional view of the third embodiment of the invention taken along lines 11-11.

A third embodiment shown in FIGS. 20 through 22 features a case 20 with two parallel vertical side walls running longitudinally 21 and a horizontal base 23 forming the floor. Two sets of binding screws, which each consist of a threaded screw 46 received by a internally threaded sleeve with a smooth exterior 47, connect through aligned holes in the case's vertical side walls 48 and holes in the utensil holder's vertical side walls 49.

A flexible strip of rubber or a similar material 50 is securely mounted so that it stands vertically in a U-shaped channel 51 affixed transversally to the floor of the case. A transversal rod 52 spans between holes 53 in the utensil holder's side walls. A thin central handle 54 made of metal or a similar rigid material projects from the top of the central partition in the utensil holder keeping access to the utensils in the center compartments unobstructed.

The flexible strip and rod are relatively positioned so that as the user applies upward force to the utensil holder's handle 54, the rod contacts the strip and bends it downward until the rod can pass over the top. After the rod clears it, the rubber strip regains its straightness. The upright flexible strip is rigid enough to support the rod under the weight of the utensil holder and its contents in the open position, so the user can freely use both hands for inserting or removing utensils without the need to support the holder. To close the utensil holder, the user applies enough downward force to the handle to push the rod back over the flexible strip again. A stopper 55, attached to the bottom of the utensil holder, halts its descent, supporting it in a horizontal position at rest and maintaining a gap between the utensil holder and the case's floor to facilitate unobstructed pivoting.

Figure 23:
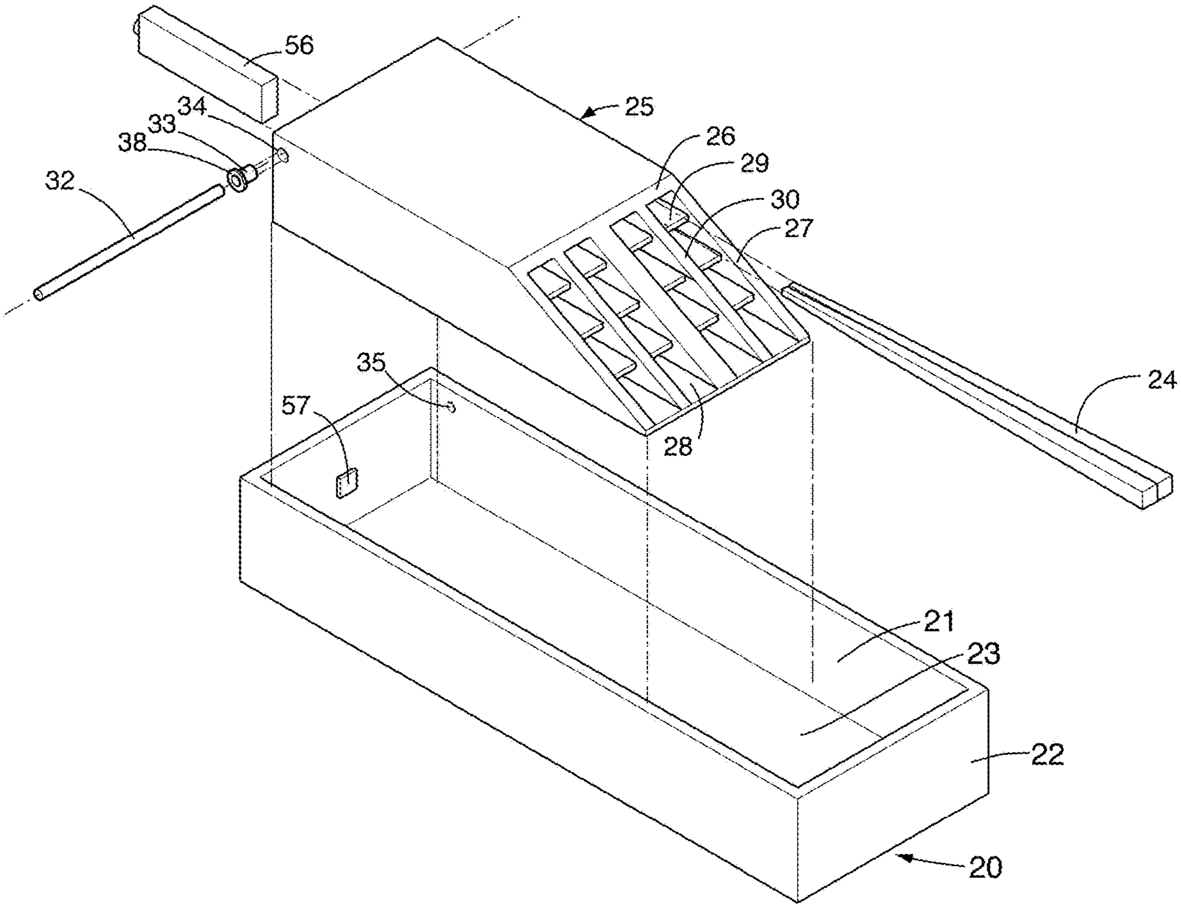
FIG. 23 is an isometric view of the fourth embodiment of the invention, separated into its major components.
Figure 24:
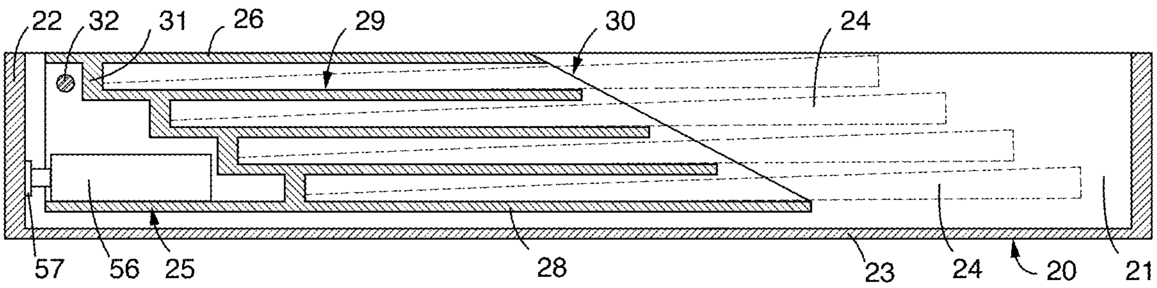
FIG. 24 is a longitudinal cross sectional view of the fourth embodiment of the invention taken along lines 10-10.
Figure 25:
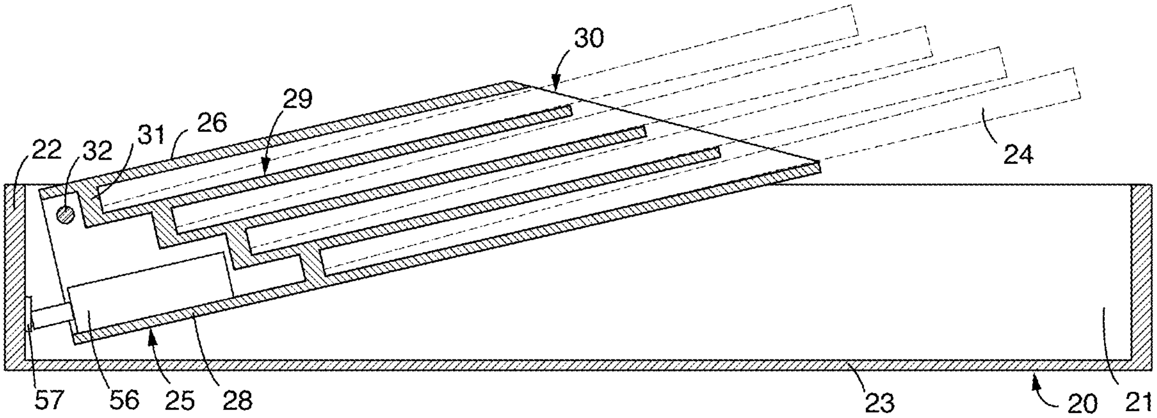
FIG. 25 is a transverse cross sectional view of the fourth embodiment of the invention taken along lines 11-11.

A fourth embodiment shown in FIGS. 23 through 25 incorporates a spring-loaded latch mechanism 56 in the rear of the utensil holder in lieu of a handle. When the user exerts downward force to the top of the utensil holder it disengages the latch mechanism and the internal spring extends its piston. The end of the piston contacts a protective pad 57 mounted onto the inside of one of the case's end walls as it pushes outward, rotating the utensil holder up into the open position. The spring's tension will hold the utensil holder in the open position, so the user can freely use both hands for inserting or removing utensils without the need to support the holder. To close, another downward push of the holder's top rotates it downward until the mechanism latches in the closed state.

What is claimed is:

1. A storage device for elongated utensils, comprising:

(a) a case comprising:
  (i) two parallel longitudinal side walls;
  (ii) two parallel transversal end walls;
  (iii) a horizontal base; and
  (iv) an open top;
(b) a utensil holder pivotally mounted within the case, comprising:
  (i) a horizontal top surface;
  (ii) two parallel side walls;
  (iii) a horizontal base;
  (iv) a handle extending outwardly from the utensil holder and contained within the interior volume of the case with sufficient clearance to permit unobstructed rotational movement; and
  (v) a plurality of tiered internal compartments arranged in rows, wherein the compartments are comprised of:
    horizontal trays arranged in a stepped configuration;
    vertical longitudinal partitions with top ends angled to correspond to the stepped configuration; and
    transverse end walls extending upward from the horizontal trays;
(c) a pivot mechanism that connects the utensil holder to the case along a transverse axis to enable rotation of the utensil holder through an arc of up to 90 degrees relative to the base of the case in an open position;
(d) stoppers mounted above the base of the case that maintain a gap between the base of the utensil holder and the base of the case in a closed position; and
(e) a retention system comprising a mechanism to hold the utensil holder at a fixed angle between zero and ninety degrees relative to the base of the case.

2. The storage device of claim 1, wherein the pivot mechanism is a rod assembly comprising:

(a) a cylindrical rod extending through the utensil holder along the transverse axis;
(b) bushings mounted within aligned holes in the side walls of the utensil holder having an inner diameter equal to an outer diameter of the cylindrical rod; and
(c) stopped holes in opposing interior surfaces of the longitudinal side walls of the case into which ends of the cylindrical rod are inserted.

3. The storage device of claim 1, wherein the pivot mechanism comprises one or more continuous hinges affixed to a corresponding rear transversal wall from the two parallel transversal end walls of the case.

4. The storage device of claim 1, wherein the pivot mechanism comprises binding screws that pass through holes in the side walls of the case and the side walls of the utensil holder.

5. The storage device of claim 1, wherein the retention system comprises:

(a) first one or more magnets embedded in an interior surface at least one of the side walls of the case; and
(b) second one or more magnets embedded in an exterior wall surface of at least one side walls of the utensil holder;
(c) wherein each of the first and second embedded magnets are positioned such that their magnetic fields will align when the utensil holder reaches a fixed angle between zero and ninety degrees relative to the base of the case.

6. The storage device of claim 1, wherein the retention system comprises:

(a) a transverse rod mounted to the utensil holder;
(b) a vertical flexible strip mounted to the base of the case positioned to contact the transverse rod as the transverse rod rotates; and
(c) wherein the flexible strip has a flexural modulus configured to maintain a total weight of the utensil holder and the utensils within the utensil holder in an elevated position.

7. The storage device of claim 1, wherein the retention system comprises a spring-loaded latch mechanism incorporated in the utensil holder that extends to push the utensil holder upward about a rotational axis of the utensil holder and retains the utensil holder in the open position by tension of a spring until the utensil holder is manually pushed downward and latched into the closed position.

* * * * *